(No Model.)
J. C. NELSON.
INTERCHANGEABLE CULTIVATOR.
No. 592,818. Patented Nov. 2, 1897.
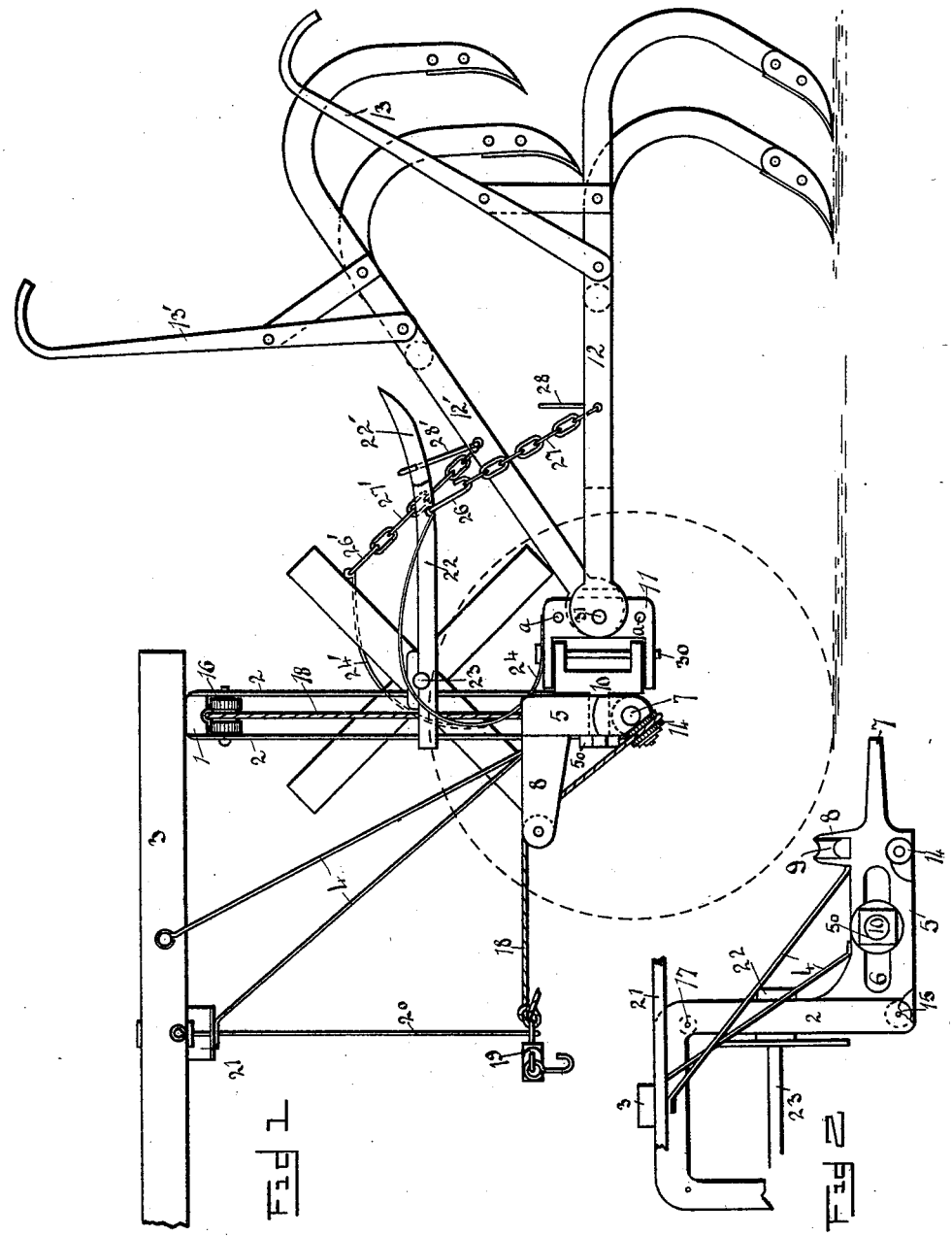
WITNESSES:
INVENTOR
James C. Nelson
BY
ATTORNEY.

UNITED STATES PATENT OFFICE.

JAMES C. NELSON, OF OMAHA, NEBRASKA.

INTERCHANGEABLE CULTIVATOR.

SPECIFICATION forming part of Letters Patent No. 592,818, dated November 2, 1897.

Application filed December 29, 1896. Serial No. 617,430. (No model.)

*To all whom it may concern:*

Be it known that I, JAMES C. NELSON, residing at Omaha, in the county of Douglas and State of Nebraska, have invented certain useful Improvements in Interchangeable Cultivators; and I do hereby declare that the following is a full, clear, and exact description of the invention, such as will enable others skilled in the art to which it appertains to make and use the same, reference being had to the accompanying drawings, which form a part of this specification.

This invention has relation to a new and novel improvement in cultivators, the object being to provide a wheeled cultivator that shall be arranged so that it can be used for a double purpose.

In the accompanying drawings, Figure 1 shows a side elevation, with parts broken away, of my cultivator, while Fig. 2 shows a broken front view thereof.

My invention comprises, essentially, an inverted-U-shaped frame, preferably comprising two metal blanks 2 2, which are connected above to a block 1, to strengthen the same, and below are provided with two stub-axles 5 5, provided with the usual axle-skein 7, adapted to receive a suitable wheel. These stub-axles 5 5 are slotted, being provided with an opening 6, within which is held a T-shaped block 10, the stem of which passes through the slot 6 and is provided with a nut 50, so that this block is securely but adjustably attached to its stub-axle 5. Extending upward and forward are the ears 8, which give support to a sheave 9, as is shown in Fig. 1, below which sheave is positioned another (marked 14) in line with a sheave 15 between the blanks 2 2, which sheave 15 in turn is lower than a sheave 16, mounted upon a pin 17, referring now to Fig. 2. These sheaves 9 14 15 16 are used in sets, there being one upon each side. Movably secured to each of the blocks 10, of which there are two, though only one is shown in the drawings, is a clip 11, provided with a series of openings *a*, adapted to hold a pin 31, which pin in turn movably secures a cultivator 12 or 12', one being shown as not used, while the one marked 12 is shown in a working position. These cultivators are provided with the operating-handles 13 13', and, further, each has a hook 28 28', as well as a chain 27 27', secured to a spring 24 24', which springs are secured to the clip 11, so that the tension of this spring may be regulated by adjusting the same within the various loops of these chains. At a suitable point the frame-blanks 2 are pivoted with the rear-extending holders 22, used in pairs, which act as a support in holding the cultivators when not in use. Mounted upon these holders 22 is a shaft 23, comprising an ordinary wire-reel, used in stretching or unwinding wire fencing. Secured to the frame-bars 2 2 centrally is a tongue 3, supporting a transverse bar 21, secured to the frame by means of the brace-bars 4 4, used in sets of two, and which bar 21 further supports two depending bars 20, to which are secured ordinary singletrees 19, which are used in pairs. The singletrees are connected to the cultivator by means of a strand 18, extending from one singletree to the other and passing over the sheaves 9 9, 14 14, 15 15, then upward and over the two sheaves 16 16, so as to form a draft-equalizer. In the drawings but one set of these sheaves is shown, though it should be understood that two similar sets are used. This arrangement comprises my invention. By means of the springs 24 24' the cultivators are held in tension, as it were, so that the operator can nicely guide them through the earth, his pressure directing the depth to which the shares are to sink, while the springs aid in promptly withdrawing these shares.

The forward end of the cultivator, by means of the block 10, is given lateral adjustment, while by means of the clip 11 the forward cultivator end is given a vertical adjustment by virtue of the openings *a* and the pin 31. While not in use as a cultivator the pins 31 can be withdrawn to remove the clip 11 and all connected thereto, so as to provide a skeleton vehicle or sulky, which could be used as a water-carrier in suspending a barrel between the inverted-U frame, or be used as a hose or wire reel cart, the arms 22 22' being adapted to receive a seat on which the operator can rest while the device is used for purposes other than a cultivator.

Now, having thus described my said invention, what I claim as new, and desire to secure by United States Letters Patent, is—

1. The combination in a cultivator of an inverted-U-shaped hollow frame a tongue extending centrally from said frame slotted stub-axles extending laterally below said frame a T-shaped block adjustably held within each of said slotted stub-axles a clip movably secured to said blocks provided with a series of pin-openings a pin within said openings a cultivator secured to each of said clips by means of said pins, said cultivators being used in pairs, a spring secured to each of said clips a chain secured to each of said cultivators said springs being used in pairs and adapted to removably and adjustably engage said chains to hold said cultivator-frames in tension all substantially as and for the purpose set forth.

2. The combination in a cultivator of an inverted-U-shaped hollow frame a tongue extending centrally from said frame slotted stub-axles extending laterally below said frame a T-shaped block adjustably held within each of said slotted stub-axles a clip movably secured to said blocks provided with a series of pin-openings a pin within said openings a cultivator secured to each of said clips by means of said pins a spring secured to said clip a chain secured to each of said cultivators said springs being used in pairs and adapted to removably and adjustably engage said chains to hold said cultivators in tension and the sheaves 9, 14, 15, 16, used in pairs and secured to said cultivators and adapted to receive the strand 18 provided with the singletrees 19 all substantially as and for the purpose set forth.

In testimony whereof I affix my signature in presence of two witnesses.

JAMES C. NELSON.

Witnesses:
C. L. THOMAS,
W. A. WEBSTER.